US012752471B2

(12) United States Patent
Coing et al.

(10) Patent No.: US 12,752,471 B2
(45) Date of Patent: Oct. 6, 2026

(54) MOLD, MOUDING MACHINE AND METHOD FOR MOLDING BY EXTRUSION BLOW-MOLDING

(71) Applicant: Plastic Omnium Advanced Innovation and Research, Brussels (BE)

(72) Inventors: Jean-François Coing, Brussels (BE); Antoine Chaussinand, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 202 days.

(21) Appl. No.: 18/553,673

(22) PCT Filed: Apr. 5, 2022

(86) PCT No.: PCT/EP2022/058950

§ 371 (c)(1),
(2) Date: Oct. 2, 2023

(87) PCT Pub. No.: WO2022/214462

PCT Pub. Date: Oct. 13, 2022

(65) Prior Publication Data

US 2024/0190062 A1 Jun. 13, 2024

(30) Foreign Application Priority Data

Apr. 6, 2021 (LU) ........................................ 102744

(51) Int. Cl.
*B29C 49/42* (2006.01)
*B29C 49/20* (2006.01)
(Continued)

(52) U.S. Cl.
CPC ........ *B29C 49/42448* (2022.05); *B29C 49/20* (2013.01); *B29C 49/4815* (2013.01);
(Continued)

(58) Field of Classification Search
CPC . B29C 49/4815; B29C 49/4823; B29C 49/20; B29C 49/4242; B29C 49/42448;
(Continued)

(56) References Cited

U.S. PATENT DOCUMENTS

| | | | | |
|---|---|---|---|---|
| 5,891,385 A * | 4/1999 | Cerbelle | ................. | B29C 49/20 264/572 |
| 9,616,608 B2 * | 4/2017 | Coing | ...................... | B29C 49/22 |

(Continued)

FOREIGN PATENT DOCUMENTS

| | | |
|---|---|---|
| CN | 105555502 A | 5/2016 |
| CN | 112368124 A | 2/2021 |

(Continued)

OTHER PUBLICATIONS

International Search Report Issued Jun. 10, 2022, in PCT/EP2022/058950, filed on Apr. 5, 2022, 2 pages.

(Continued)

*Primary Examiner* — Monica A Huson
(74) *Attorney, Agent, or Firm* — Oblon, McClelland, Maier & Neustadt, L.L.P.

(57) ABSTRACT

A mold for manufacturing, by extrusion blow-molding, containing two parts having at least a first section having a first molding surface having a plurality of contact regions configured to simultaneously form, by pressing, regions for fixing at least one internal component to the inside of a parison, and a second section having a second molding surface. The second section of the part of the mold is movable with respect to the at least one first section associated with the part of the mold.

18 Claims, 5 Drawing Sheets

(51) Int. Cl.

*B29C 49/48* (2006.01)
*B29C 49/04* (2006.01)
*B29L 31/00* (2006.01)

(52) U.S. Cl.

CPC .......... *B29C 49/4823* (2013.01); *B29C 49/04* (2013.01); *B29C 2049/2056* (2013.01); *B29C 2049/4807* (2013.01); *B29C 2049/4879* (2013.01); *B29C 2791/006* (2013.01); *B29L 2031/7172* (2013.01)

(58) Field of Classification Search

CPC ...... B29C 2049/483; B29C 2049/2056; B29C 2049/4825; B29C 49/04; B29C 2049/4879; B29C 2791/006; B29C 2049/4807; B29L 2031/7172

See application file for complete search history.

(56) References Cited

U.S. PATENT DOCUMENTS

| | | | |
|---|---|---|---|
| 2009/0026664 | A1 | 1/2009 | Criel et al. |
| 2014/0144914 | A1 | 5/2014 | Yager et al. |
| 2014/0265052 | A1 | 9/2014 | Majima et al. |
| 2019/0022910 | A1 | 1/2019 | Ikegaya et al. |

FOREIGN PATENT DOCUMENTS

| | | | |
|---|---|---|---|
| EP | 1 211 196 | A1 | 6/2002 |
| EP | 2 614 948 | A1 | 7/2013 |
| JP | 9-117956 | A | 5/1997 |
| JP | 2009-149004 | A | 7/2009 |
| JP | 2016-47635 | A | 4/2016 |
| WO | WO 2007/090453 | A2 | 8/2007 |
| WO | WO 2008/138869 | A1 | 11/2008 |
| WO | WO 2020/205568 | A1 | 10/2020 |

OTHER PUBLICATIONS

Japanese Office Action issued Jan. 27, 2026 in Japanese Patent Application No. 2023-558224 (with English translation), 10 pages.

Combined Chinese Office Action and Search Report issued Apr. 16, 2026 in Chinese Patent Application No. 202280026581.9 (with English translation), 19 pages.

* cited by examiner

MOLD, MOUDING MACHINE AND METHOD FOR MOLDING BY EXTRUSION BLOW-MOLDING

CROSS REFERENCE TO RELATED APPLICATIONS

This application is a National Stage entry under 35 U.S.C. § 371 of PCT/EP2022/058950, filed on Apr. 5, 2022, and claims priority to Luxembourg Patent Application No. LU102744, filed on Apr. 6, 2021, the entire contents of which are incorporated herein by reference.

TECHNICAL FIELD OF THE INVENTION

The present invention relates to a mold for manufacturing by extrusion blow-molding a hollow tank body made of plastic material for a motor vehicle from a parison, the tank comprising at least one internal component fixed inside the parison during the molding of the hollow body. More particularly, the invention relates to a mold comprising two parts comprising a plurality of sections internally defining a mold cavity comprising a total molding surface intended to reproduce a predetermined shape of the hollow body to be manufactured.

The invention also relates to a machine for molding by extrusion blow-molding a hollow tank body made of plastic material for a motor vehicle from a parison.

The invention finally relates to a method for molding by extrusion blow-molding a hollow tank body made of plastic material for a motor vehicle from a parison, the tank comprising at least one internal component fixed inside the parison during the molding of the hollow body.

TECHNICAL BACKGROUND OF THE INVENTION

In document WO 2008/138869, the Applicant describes a mold for manufacturing a fuel tank provided with an internal component or a set of internal components. The mold cavities comprise a plurality of movable rods, a contact surface is provided at the free end of each movable rod to locally push the parison in the molten state and bring it into contact with a region of an internal component to form, by pressing, a fixing of the internal component inside the parison. Another example is described in document US 2014/265052.

Since the contact surface of a movable rod is limited by its cross-section, the more regions to be fixed the internal component has, the more movable rods must be provided. The free end of a movable rod typically has a contact surface of about 4000 $mm^2$, which represents less than 2% of the total surface area of the mold. With six movable rods, it is less than 12% of the total surface area of the mold. Likewise, the more internal components are contained in the set of internal components, the more movable rods must be provided. This is not satisfactory because the design of the mold becomes more complex and more expensive to manufacture.

Furthermore, the Applicant has observed that in the location where the parison is pushed by a movable rod toward a region of an internal component, the material of the parison is stretched toward this fixing region so that the parison has a reduced thickness at the fixing. This is not desirable because a reduction in the thickness of the material at the location of the fixing can cause a lack of fixing of the internal component. Furthermore, the reduction in thickness observed at the fixing is often accompanied by another deformation. This other deformation is a rippling of the material around the fixing. This is not desirable since the more deformations the reservoir undergoes during its manufacture, the worse the mechanical resistance of the resulting reservoir will be. The aforementioned risks are obviously aggravated by the proliferation of the movable rods.

The Applicant has also observed that the proliferation of the movable rods leads to a degradation of the cooling temperature of the mold because the movable rods do not form part of the cooling circuit of the mold. This is not satisfactory because a degradation of the cooling temperature homogeneity of the mold is likely to cause deformations of the tank during its manufacture.

Another disadvantage of the above-mentioned mold is that the proliferation of the movable rods leads to the proliferation of the movement mechanisms of the movable rods, which leads to increases the size and complexity of the extrusion blow-molding machine equipped with such a mold.

It is thus understood the cost of manufacturing a tank provided with one (or more) internal component(s) increases with the number of movable rods necessary to fix the internal component(s).

SUMMARY OF THE INVENTION

The object of the invention is in particular to remedy the aforementioned disadvantages by providing a mold guaranteeing manufacturing without deformation and at a lower cost of a tank comprising one (or more) internal component(s), independently of the number of attachments of the internal component(s) inside the parison.

To this end, the invention relates to a mold for manufacturing by extrusion blow-molding a hollow tank body made of plastic material for a motor vehicle from a parison, the tank comprising at least one internal component fixed to the interior of the parison during the molding of the hollow body, the mold comprising two parts movable relative to one another delimiting internally, when they are closed against each other, a total molding surface intended to reproduce a predetermined shape of the hollow body to be manufactured, at least one of the parts of the mold comprising:

- at least one first section having a first molding surface of a first portion of the hollow body to be manufactured, said first molding surface comprising at least one contact region configured to form, by pressing, a region for fixing said at least one internal component inside the parison,
- a second section having a second molding surface of a second portion of the hollow body to be manufactured, the second section of the part of the mold being movable relative to the at least one first associated section of the mold part at least between an intermediate closing position and a final closing position of the mold parts, characterized in that the first molding surface of the mold part comprises a plurality of contact regions and is configured so that the contact regions form at the same time, by pressing, a plurality of regions for fixing said at least one internal component inside the parison.

Advantageously according to the invention, the mold makes it possible to fix one or more internal components without resorting to a plurality of movable rods, those being replaced by a mold section having a molding surface that is sufficiently extended to be able to press the parison against a plurality of regions for fixing the internal component(s) at the same time.

In addition to the savings in terms of cost, the invention makes it possible to avoid locally deforming the material of the parison during the contacting thereof with a region to be fixed due to the fact that the first molding surface extends between, that is to say in particular comprises, various regions for fixing the internal component(s) with the inside of the parison. By virtue of this arrangement, the thickness of the material at the location of each fixing region is not reduced and the rippling of the material around this fixing region is avoided.

Another advantage of the mold according to the invention is that it makes it possible to avoid increasing the size and complexity of the blow-molding machine equipped with such a mold, regardless of the number of fixing regions and the number of internal components of the future tank.

The invention may also comprise one or more of the following optional features, taken alone or in combination.

The first molding surface of the mold part may be configured to extend along a circumscribed surface containing the contact regions associated with the mold part. Thus, each part comprising a first molding surface has a single surface toward the parison in the intermediate closing position in order to fix the parison, thanks to the various distinct contact regions of the first molding surface, according to a plurality of predetermined fixing regions or all the regions for fixing said at least one internal component of the part of the mold at the same time.

The circumscribed surface of the first molding surface of the part of the mold may comprise a predetermined margin distance at least around the contact regions of said at least one internal component associated with the part of the mold in order to limit the ripples of the material around each fixing region. It is thus understood that the first molding surface comprises a single surface more extended around the regions for fixing said at least one internal component in order to avoid an excessive relief difference near the regions for fixing said at least one internal component inside the parison. The predetermined margin distance at least around the contact regions may be between 1 mm and 60 mm.

The circumscribed surface of the first molding surface of the part of the mold is preferentially at least equal to 30% of the total molding surface. It is apparent that, according to the embodiment, that is to say if only one part of the mold or the two parts of the mold comprises at least one first section, the total percentage of the at least one first mold section is respectively at least equal to 30% or at least equal to 60% of the total molding surface. However, the circumscribed surface of the first molding surface of the mold part may be between 20% and 40% of the total molding surface without departing from the scope of the invention, that is, for example equal to 20%, 21%, 22%, 23%, 24%, 25%, 26%, 27%, 28%, 29%, 30%, 31%, 32%, 33%, 34%, 35%, 36%, 37%, 38%, 39% or 40%.

Thus, according to a first embodiment, each part of the mold may comprise at least one first section and a second section and, according to a second embodiment, only one of the parts of the mold comprises at least one first section and a second section. Typically, in the second embodiment, the first part of the mold may comprise at least one first section and a second section and, the second part of the mold may comprise a single section made of one piece.

In the final closing position, the at least one first mold section of each part of the mold is preferentially surrounded by its associated second section of the part of the mold. Thus, said at least one internal component is entirely enclosed in the hollow body.

In the first embodiment, the at least one first mold section of each part of the mold may comprise at least one support region configured to press the parison against said same at least one internal component in order to form at least two different regions for fixing said same at least one internal component for fixing said same at least one internal component inside the parison during the molding of the hollow body. It is understood that at least one contact region of the at least one first section of the first part of the mold can thus be aligned, that is to say plumb with, at least part of a contact region of the at least one first section of the second part of the mold in order to fix two substantially opposite regions of the internal component at the same time in two distinct regions of the interior of the parison. Thus, the first mold sections act as a vice which clamps said at least one internal component.

Regardless of the embodiment, the at least one first section of the part of the mold may comprise, as in particular in one of the contact regions, at least one suction element intended to suction the parison during the molding of the hollow body. Thus, the parison is better pressed on the first molding surface, which also avoids the local deformation of the parison.

The at least one first section of the mold part may comprise an element selected from a gripping element, a heating element and a combined gripping and heating element for gripping and/or heating a workpiece, which may or may not be said at least one internal component, intended to be molded with the first portion of the hollow body. Thus, it is possible to connect a workpiece to the first portion of the hollow body during its molding. In one example, the gripping element is a gripper or a suction element and the heating element is an electric heater. In one example, the workpiece is a metal fastener or fibrous reinforcement. In another example, the heating element is a hydraulic heater.

The at least one first section of the part of the mold may comprise a blowing tool intended to introduce a pressurized gas inside the parison. In one example, the blowing tool is a blowing needle. Insofar as a blowing tool is necessary, this arrangement makes it possible to avoid placing a blowing tool in the second mold section, which would have the consequence of degrading the evaporative and mechanical performance of the resulting tank, as well as increasing the risks of deformation experienced by the tank during its manufacture.

The at least one first section of the part of the mold may comprise a first cooling device intended to cool the first portion of the hollow body. This makes it possible to avoid any deformation of the first portion of the hollow body during its manufacture.

The second section of the part of the mold may comprise a second cooling device intended to cool the second portion of the hollow body. This makes it possible to avoid any deformation of the second portion of the hollow body during its manufacture.

Advantageously, the first cooling device and the second cooling device are part of the same cooling circuit. This makes it possible to homogenize the temperature of the mold.

The at least one first section of the part of the mold may comprise a plurality of first sections in order to increase the modularity of the mold.

The invention also relates to a machine for molding by extrusion blow-molding a hollow tank body made of plastic material for a motor vehicle from a parison, characterized in that the machine comprises a mold as presented above. Thus, the molding machine benefits from all the advantages associated with the mold.

The invention finally relates to a method for molding by extrusion blow-molding a hollow tank body made of plastic material for a motor vehicle from a parison, the tank comprising at least one internal component fixed inside the parison during the molding of the hollow body, characterized in that the method comprises the following steps:

a) introducing said at least one internal component and the molten parison into an open mold in two parts so that said at least one internal component is surrounded by the parison, at least one part of the mold comprising at least one first section and a second section internally delimiting a first molding surface and a second molding surface, respectively, of a total molding surface of the mold, b) moving the at least one first section of the part of the mold to bring the mold into an intermediate closing position wherein the at least one first section of the part of the mold presses the parison against said at least one internal component in order to fix said at least one internal component inside the parison, the first molding surface being configured to form at the same time, by pressing, a plurality of regions for fixing said at least one internal component inside the parison, c) moving the second section of the part of the mold relative to the at least one first section of the part of the mold to bring the mold into a final closing position wherein the two parts of the mold are closed against each other by internally delimiting the total molding surface for reproducing a predetermined shape of the hollow body to be manufactured, d) performing a blowing of the parison by placing said parison on the total molding surface of the mold using a pressurized gas, e) opening the mold to take out the manufactured hollow body.

The molding method according to the invention preferably uses an extruded parison. According to the invention, each internal component is surrounded by the parison, either by extruding the parison around each internal component, or by inserting each internal component into the parison. In the case where the internal component is inserted into the parison, the parison can be brought into the open mold by means of a robot.

The extruded parison can be stretched to allow insertion of the internal component without risk of collision with the parison; this may be done by an appropriate device. In one example, the molding method according to the invention uses a tool to stretch the parison to hold it open, such as, for example, of the type referenced 6 in document WO 2008/138869. This tool may consist of clamps, jaws or pincers capable of gripping the edges of the parison and of holding them apart. This tool can be controlled by a robot.

The invention may also comprise one or more of the following optional features, taken alone or in combination.

Preferably, a pressurized gas is introduced inside the parison to pre-blow said parison between step a) and step b). Such an introduction of gas can be carried out according to step b of document WO 2008/138869 in order in particular to expand the parison by homogenizing the thickness of the parison. The introduction of gas at lower pressure than for step d) can be obtained in different ways known by a person skilled in the art. As a non-limiting example, the introduction of gas for the pre-blowing can be obtained by the blowing tool used to perform step d), by a dedicated tool mounted on the mold, by a hollow shaft for internal component support or by a nozzle comprised in the parison extrusion head.

In step b), said at least one internal component can be fixed inside the parison by welding, heading or mechanical anchoring.

BRIEF DESCRIPTION OF THE DRAWINGS

Other features and advantages of the invention will become apparent from the description given below, by way of indication and in no way limiting, with reference to the accompanying drawings, wherein.

DETAILED DESCRIPTION OF AT LEAST ONE EMBODIMENT OF THE INVENTION

Figure 1:
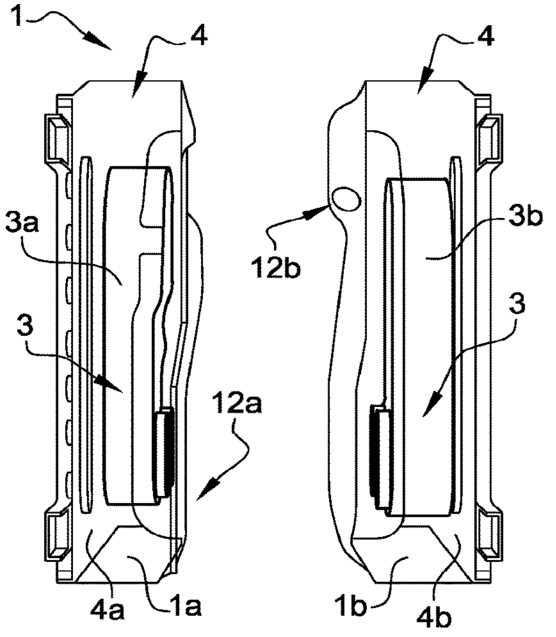
FIG. 1 is a partial side view of a mold according to a first embodiment of the invention in the open position.

In the various figures, identical or similar elements bear the same references, optionally with an index added. The description of their structure and their function is therefore not always repeated.

In the following, the orientations are the orientations of the figures. In particular, the terms "upper", "lower", "left", "right", "above", "below", "forward" and "backward" are generally understood relative to the direction of representation of the figures.

"Tank" is understood to mean a sealed tank able to store a fluid under diverse and varied conditions of use and environments. The tank manufactured with the mold according to the invention is made with a wall formed of plastic material. A tank wall has an inner surface and an outer surface. The inner surface is the surface facing the space inside the tank while the outer surface is the surface facing the space outside the tank.

The term “plastic material” or “plastic” means any material comprising at least one polymer made of synthetic resin. All types of plastics may be suitable. Plastics that are well-suited to the category of thermoplastic materials.

“Thermoplastic material” refers to any thermoplastic polymer, including thermoplastic elastomers, as well as mixtures thereof. The term “polymer” refers to both homopolymers and copolymers (in particular binary or ternary). Examples of such copolymers are, in a non-limiting manner: random copolymers, block copolymers, block copolymers and grafted copolymers.

Any type of thermoplastic polymer or copolymer whose melting point is lower than the decomposition temperature is suitable. Synthetic thermoplastic materials which have a melting range spread over at least 10 degrees Celsius (10° C.) are particularly suitable. Examples of such materials are those which exhibit a polydispersion of their molecular mass.

In particular, it is possible to use polyolefins, thermoplastic polyesters, polyketones, polyamides and copolymers thereof. A mixture of polymers or copolymers may also be used, as well as a mixture of polymeric materials with inorganic, organic and/or natural fillers such as, for example, but not limited to: carbon, salts and other inorganic derivatives, natural or polymeric fibers. It is also possible to use multilayer structures consisting of stacked and integral layers comprising at least one of the aforementioned polymers or copolymers.

A polymer often employed is polyethylene. Excellent results were obtained with high-density polyethylene (HDPE).

In one example, the tank manufactured with the mold according to the invention is a fuel tank that comprises a multilayer structure comprising at least one layer of thermoplastic material and at least one additional layer which can advantageously consist of a liquid and/or gas barrier material. Preferably, the nature and the thickness of the barrier layer are chosen so as to limit as much as possible the permeability of the liquids and of the gases in contact with the wall of the tank. Preferably, this layer is based on a barrier material, that is to say a resin impermeable to a fuel such as EVOH, for example (ethylene copolymer—partially hydrolyzed vinyl acetate). Alternatively, the tank may be subjected to a surface treatment (fluorination or sulfonation), the purpose of which is to make it impermeable to the fuel.

“Parison” is understood to mean a single-piece preform, generally extruded and of a substantially tubular shape, which is intended to constitute the wall of the tank after molding, that is after an operation which consists in placing the parison, which is in the molten state, with the required shapes and dimensions using the mold to obtain a tank.

“Internal component” is understood to mean a component having a function to be fulfilled in the tank such as ventilating, reinforcing, pumping fluid, measuring the level of the fluid, decreasing the noise related to the waves of fluid in the tank. In one example, the internal component is a reinforcement pillar that connects two opposite sides of the inner surface of the tank.

“First section” and “second section” of the mold are understood to mean respectively a first and a second molding element located in at least one of the parts of the mold.

“First molding surface” means the inner surface of the at least one first mold section delimiting the molding space of the first portion of the hollow body. This inner surface comprises a bottom and portions protruding from the bottom.

“Second molding surface” means the inner surface of the at least one second mold section delimiting the molding space of the second portion of the hollow body. This inner surface comprises a bottom and portions protruding from the bottom.

“The first molding surface is at least equal to 30% of the total molding surface” means that the area of the first molding surface is greater than or equal to 30% of the area of the total molding surface while being strictly less than 100% of the area of the total molding surface.

Advantageously, the sum of the molding surfaces of the two parts of the molding is equal to the total molding surface. Thus, the two parts of the mold are sufficient to manufacture the hollow tank body in its entirety.

“Plastic welding” means a set of techniques used to weld two thermoplastic parts. By way of example, plastic welding may consist, insofar as the materials of the internal component and of the parison are compatible with the welding, of applying, by pressing each contact region of the at least one first mold section, a contact pressure at the interface between the interior of the parison, which is in the molten state, and a region to be fixed of said at least one internal component. To facilitate the plastic welding, the region to be fixed of said at least one internal component is preferably previously heated to be softened and melted.

“Heading” means a set of techniques used to fix an internal component to the parison, in particular in the case where the materials of the internal component and the parison are not compatible with the welding, by pressing each contact region of the at least one first mold section, in order to induce a portion of the parison to enter a recess of the internal component by creeping therein. After the hardening of the parison, the heading prevents the component from coming out of the hardened parison, thanks to the shape of the recess. Examples of a hardened parison form and a component recess are respectively referenced 5 and 3 in FIGS. 1 and 2 of document WO 2007/090453.

“Mechanical anchoring” means a set of techniques used to fix an internal component to the parison, in particular in the case where the materials of the internal component and the parison are not compatible with the welding, by pressing each contact region of the at least one first mold section, in order to induce a part of the internal component to enter the parison by creeping therein. After the hardening of the parison, the mechanical anchoring prevents the internal component from coming out of the hardened parison, thanks to the shape of the internal component that entered the parison. Examples of a hardened parison form and an internal component entry part are respectively referenced 116 and 102 in FIG. 10 of document EP 1 211 196.

The extrusion-blow members known to the person skilled in the art are usually reproduced barring some exceptions indicated in the present description. Common members such as the supports for internal components (for example rods), the blowing means, the means for manufacturing the parison, the means for separating and guiding the parison around the internal components or the means for sealing the parison in order to perform pre-blowing, such as those explained for example in the document WO 2008/138869 (see in particular references 3, 6, 7 and 7') are therefore not always described in the present description.

The following embodiments are examples. Although the description refers to one or more embodiments, this does not necessarily mean that each reference relates to the same embodiment, or that the features apply only to a single embodiment. Simple features of different embodiments can also be combined and/or interchanged to provide other embodiments.

In the present description, it is possible to index certain elements or parameters, for example first element or second element as well as first parameter and second parameter or first criterion and second criterion, etc. In this case, it is a simple indexing for differentiating and naming similar but non-identical elements or parameters or criteria. This indexing does not mean that one element, parameter or criterion has priority relative to another, and such designations can easily be changed without departing from the scope of the present description. This indexing does not imply a temporal order, for example, for assessing such a criterion.

Figure 2:
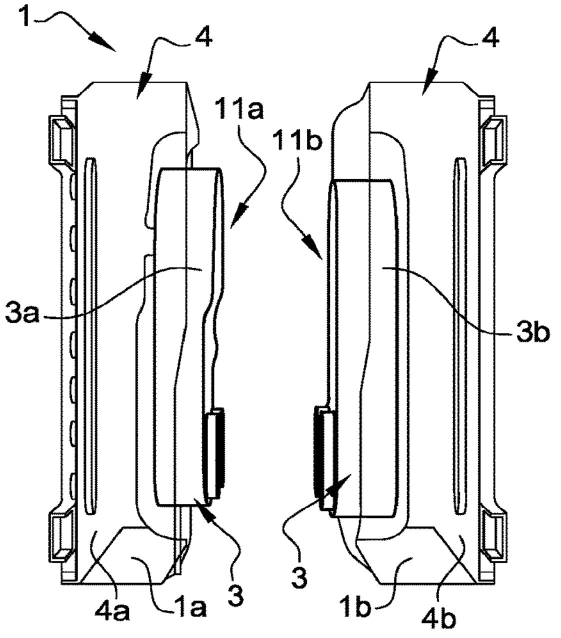
FIG. 2 is a partial side view of a mold according to a first embodiment of the invention in the intermediate closed position.

FIGS. 1 and 2 show a mold 1 for manufacturing by extrusion blow-molding a hollow body 10 of a tank made of plastic for a motor vehicle from a parison 20, the tank comprising at least one internal component 30 fixed inside the parison during the molding of the hollow body. More particularly, FIG. 1 shows the mold 1 in the open position and FIG. 2 shows the mold in an intermediate closed position. As explained below, the hollow body 10 is obtained when the mold 1 is in the final closed position (shown in FIGS. 7 and 10).

The mold 1 comprises two parts 1*a* and 1*b* that can be moved relative to each other, internally delimiting, when they are closed against each other (as visible in FIGS. 7 and 10), a total molding surface, or cavity 2, intended to reproduce a predetermined shape of the hollow body 10 to be manufactured.

According to the invention, at least one of the parts 1*a*, 1*b* of the mold 1 comprises:

at least one first section 3*a*, 3*b* having a first surface 11, 11*a*, 11*b* for molding a first portion of the hollow body 10 to be manufactured, said first molding surface 11, 11*a*, 11*b* comprising at least one support region 5 configured to form, by pressing, a region for fixing the interior of the parison 20 with said at least one internal component 30, a second section 4, 4*a*, 4*b* having a second surface 12, 12*a*, 12*b* for molding a second portion of the hollow body 10 to be manufactured.

Figure 6:
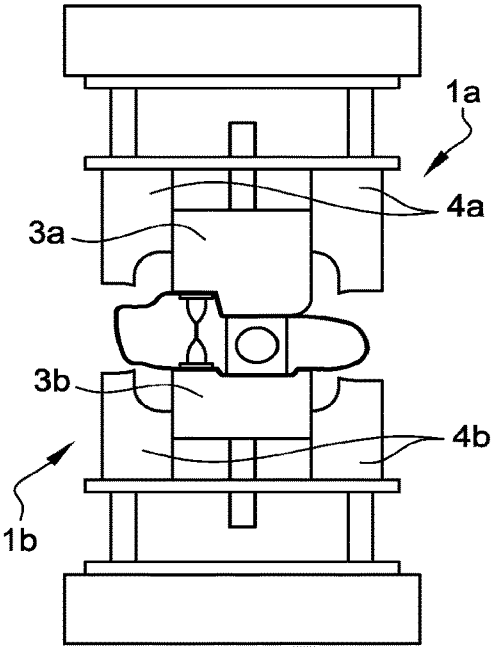
Figure 7:
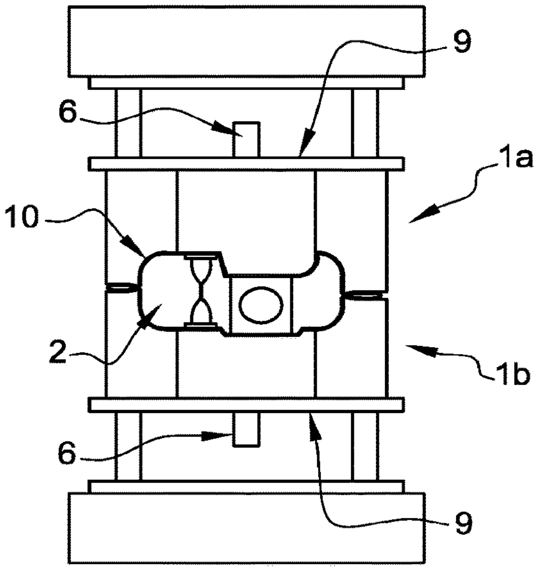
Figure 9:
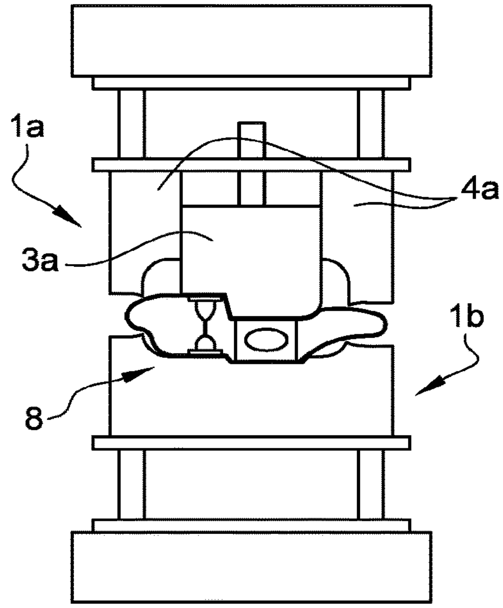
Figure 10:
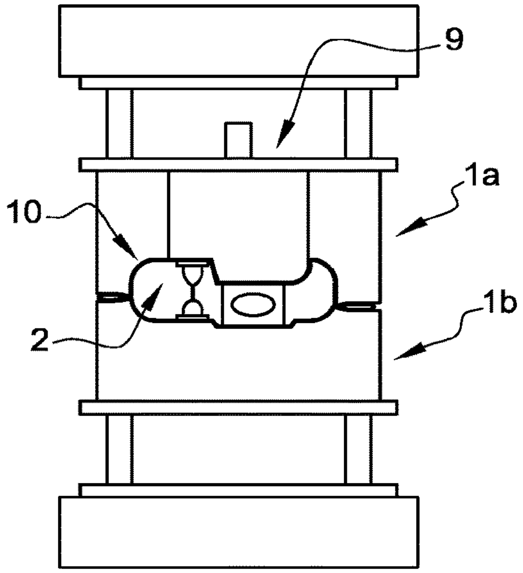

The second section 4, 4*a*, 4*b* of the part 1*a*, 1*b* of the mold 1 is movable relative to its at least one first section 3, 3*a*, 3*b* associated with the part 1*a*, 1*b* of the mold 1 between at least one intermediate closing position of the parts 1*a*, 1*b* of the mold 1 (shown in FIGS. 2, 6 and 9) and a final closing position of the parts 1*a*, 1*b* of the mold 1 (shown in FIGS. 7 and 10).

Figure 3:
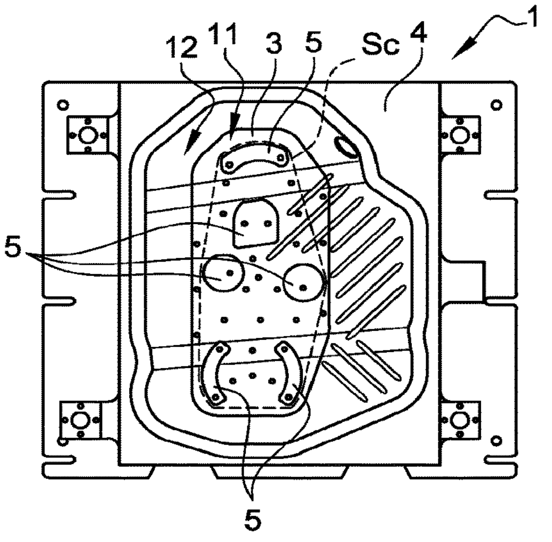
FIG. 3 is a front view of a mold part according to the first embodiment of the invention in the open position.
Figure 4:
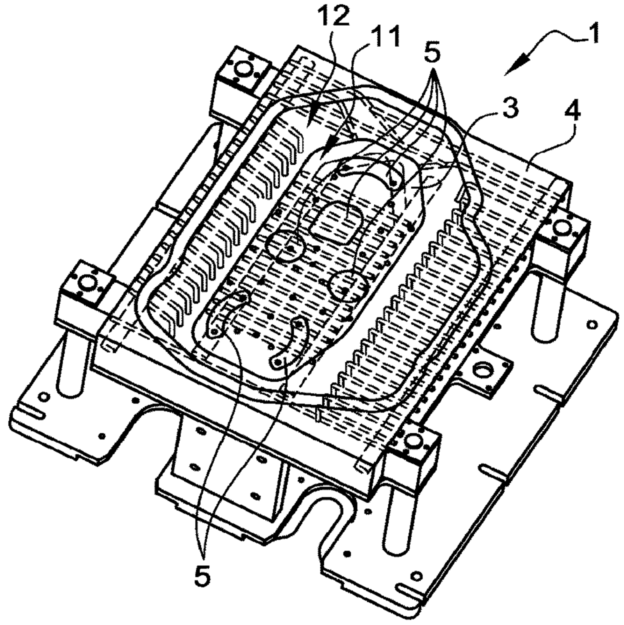
FIG. 4 is a perspective view of a mold part according to the first embodiment of the invention in the open position.

Advantageously according to the invention, the first molding surface 11, 11*a*, 11*b* of the part 1*a*, 1*b* of the mold 1 comprises a plurality of support regions 5 as shown in FIGS. 3 and 4 and is configured so that the support regions 5 simultaneously form, by pressing, a plurality of regions for fixing said at least one internal component 30 inside the parison 20.

As shown in FIG. 3, the first molding surface 11, 11*a*, 11*b* of the part 1*a*, 1*b* of the mold 1 can thus be configured to extend along a circumscribed surface Sc (in dashed lines in FIG. 3) containing support regions 5 of the part 1*a*, 1*b* of the mold 1, or all the contact regions 5 associated with the part 1*a*, 1*b* of the mold 1. Of course, the circumscribed surface Sc in broken lines in FIG. 3 is only one example and the support regions 5 may not be interconnected by rectilinear segments but curved segments without departing from the scope of the invention.

Thus, each part 1*a*, 1*b* comprising a first molding surface 11, 11*a*, 11*b* has a single surface toward the parison 20 in the intermediate closing position (shown in FIGS. 2, 6, and 9) in order to fix the parison 20, thanks to the various distinct contact regions 5 of the first molding surface 11, 11*a*, 11*b*, according to a plurality of predetermined fixing regions or all the regions for fixing said at least one internal component 30 of the part 1*a*, 1*b* of the mold 1 at the same time.

The circumscribed surface Sc of the first molding surface 11, 11*a*, 11*b* of the part of the mold may comprise a predetermined margin distance at least around the contact regions 5 of said at least one internal component 30 associated with the part of the mold 1 in order to limit the ripples of material around each fixing region. The predetermined margin distance at least around the contact regions 5 may be between 1 mm and 60 mm. Of course, the predetermined margin distance is not necessarily constant relative to each support region 5 or between each contact region. FIG. 3 thus shows an example of a first surface 11 whose predetermined margin is not constant around another example of a circumscribed surface Sc in dashed lines without the invention being limited thereto.

The circumscribed surface of the first molding surface 11, 11*a*, 11*b* of the part 1*a*, 1*b* of the mold 1 is preferentially at least equal to 30% of the total molding surface. It is apparent that, according to the embodiment, that is to say if only one part 1*a*, 1*b* of the mold 1 or both parts 1*a*, 1*b* of the mold 1 comprises at least one first section 3, 3*a*, 3*b*, the total percentage of the at least one first mold 1 section 3, 3*a*, 3*b* is respectively at least equal to 30% or at least equal to 60% of the total molding surface. However, the circumscribed surface Sc of the first molding surface 11, 11*a*, 11*b* of the mold part 1*a*, 1*b* may be between 20% and 40% of the total molding surface without departing from the scope of the invention, that is, for example equal to 20%, 21%, 22%, 23%, 24%, 25%, 26%, 27%, 28%, 29%, 30%, 31%, 32%, 33%, 34%, 35%, 36%, 37%, 38%, 39% or 40%.

Figure 5:
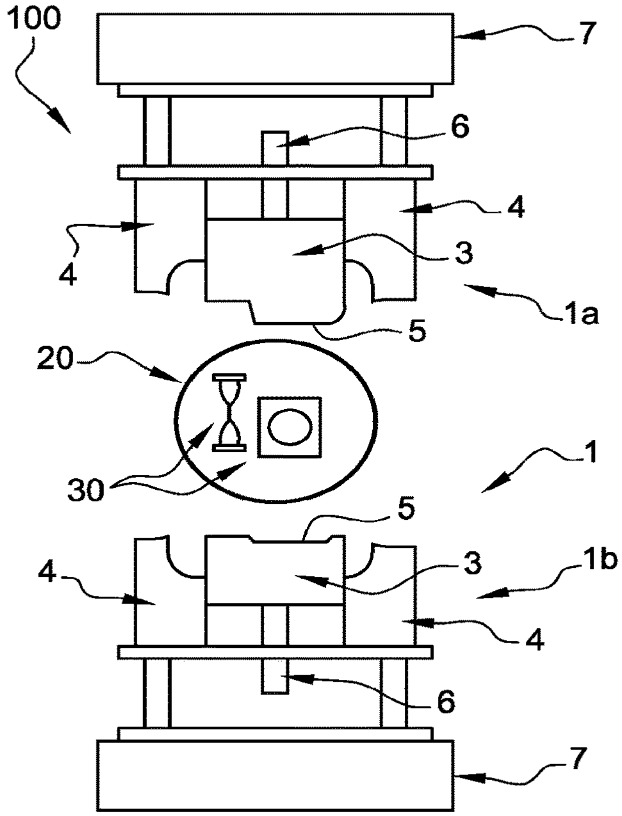
FIGS. 5 to 7 are schematic sectional views of the first embodiment of a mold according to the invention in different successive positions.

FIGS. 5 to 7 show a machine 100 for molding by blow-molding a hollow body 10 of a plastic material for a motor vehicle from a parison 20. The machine 100 comprises the mold 1 presented above according to a first embodiment. FIG. 5 shows the mold 1 in the open position (open mold 1), FIG. 6 shows the mold 1 in the intermediate closed position and FIG. 7 shows the mold in the final closed position.

In the intermediate closing position, the at least one first section 3, 3*a*, 3*b* of mold 1 protrudes from the second mold section 4, 4*a*, 4*b* of mold 1. In the final closing position, the second mold section 4, 4*a*, 4*b* of mold 1 surrounds the at least one first section 3, 3*a*, 3*b* of mold 1 which has not changed position, so that the first 11, 11*a*, 11*b* and second 12, 12*a*, 12*b* molding surfaces join together to form the total molding surface, or cavity 2.

The at least one first section 3, 3*a*, 3*b* of mold 1 comprises contact regions 5 configured to press the parison 20 against said at least one internal component 30 in order to form at least two different regions for fixing said same at least one internal component 30 in order to fix said same at least one internal component 30 inside the parison 20 during the molding of the hollow body 10.

Advantageously, each support region 5 is configured to allow the welding, the heading or the mechanical anchoring to fix said at least one internal component 30 inside the parison 20 during the molding of the hollow body 10. Each support region can thus comprise a geometry, mechanical characteristics and/or a material intended to facilitate welding, heading or mechanical anchoring. By way of non-limiting example, the support region 5 may comprise a flat surface, the material of which has a melting point greater than that of the parison and the region to be fixed of the internal component so that, by pressing the contact region, at least one welding fixing region is formed between the parison and the region to be fixed of the internal component. Of course, in addition or in substitution, the support region may also comprise a protrusion intended to promote a crimping and/or a recess intended to promote mechanical anchoring.

The first mold 1*a* part 1 comprises at least one first section 3*a* of mold 1 and, the second mold part 1*b* of mold 1 comprises at least another first section 3*b* of mold 1. The at least one first section 3*a* of mold 1 is movable relative to the at least one other first section 3*b* of mold 1 between the open position and the intermediate closed position of the mold 1. The at least one first section 3*a*, 3*b* of each mold 1 part 1*a*, 1*b* comprises a first actuator 6 for going from the open position to the intermediate closing position and vice versa.

The first mold 1 part 1*a* comprises at least one second section 4*a* of mold 1 and, the second mold 1 part 1*b* comprises at least another first mold 1 section 4*b*. The second mold sections 4*a*, 4*b* of mold 1 are movable relative to each other between the intermediate closure position and the final closed position of the mold 1. Each second mold section 4*a*, 4*b* of mold 1 comprises a second actuator 7 for going from the intermediate closed position to the final closed position and vice versa.

Figure 11:
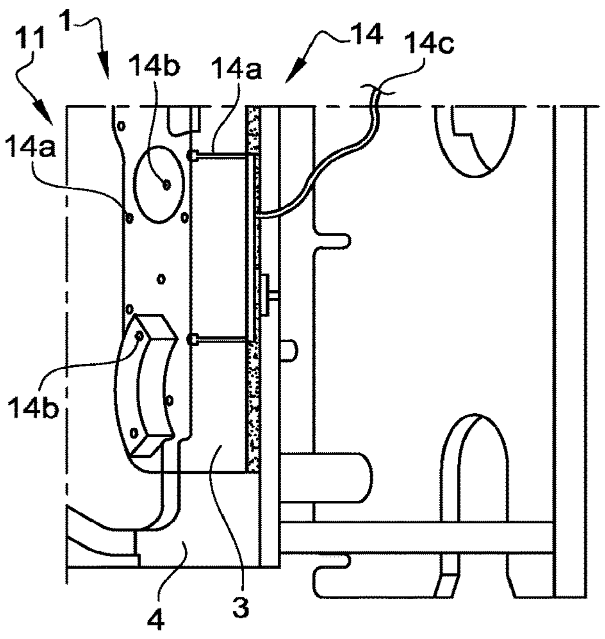
FIG. 11 is a cross-sectional view of a mold part according to the invention showing suction elements.

In the example shown in FIG. 11, the at least one first mold section 3 comprises, in at least one support region 5, at least one suction element 14*b* intended to suction the parison 20 during the molding of the hollow body 10. It can also be seen that the bottom of the first molding surface 11 also comprises at least one suction element 14*a*. It can also be seen that a plurality of suction elements 14*a* are interconnected and communicate via a connection 14*c* with a suction device (not shown) such as a vacuum machine. Thus, the parison 20 is better pressed on the first molding surface 11, which also avoids the local deformation of the parison 20.

Figure 13:
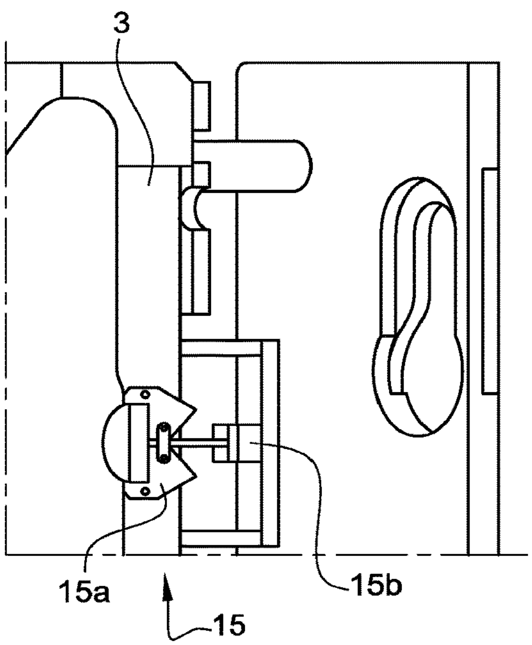
FIG. 13 is a cross-sectional view of a mold part according to the invention showing a gripping element in the non-activated state.
Figure 14:
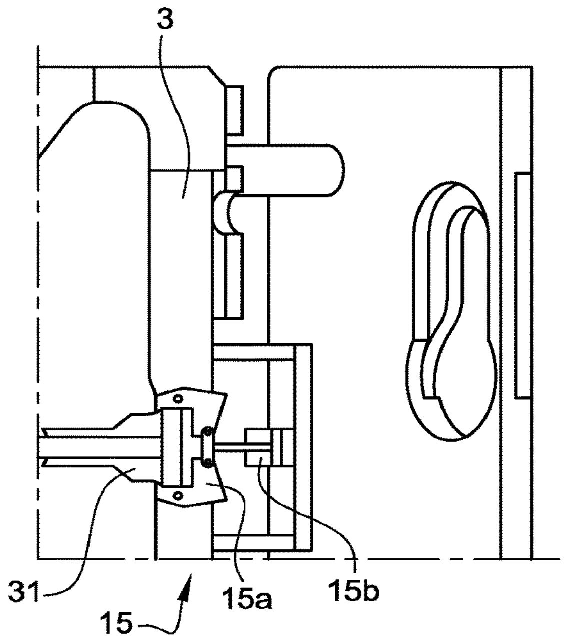
FIG. 14 is a cross-sectional view of a mold part according to the invention showing a gripping element in the activated state.
Figure 15:
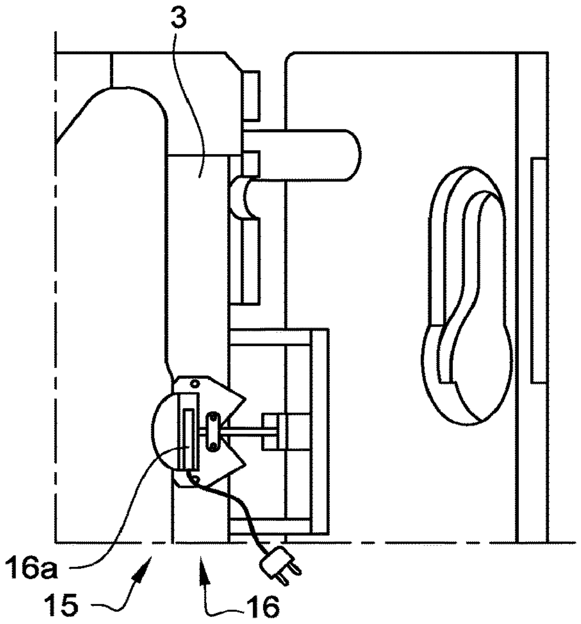
FIG. 15 is a cross-sectional view of a mold part according to the invention showing a combined gripping and electrical heating element in the non-activated state.
Figure 16:
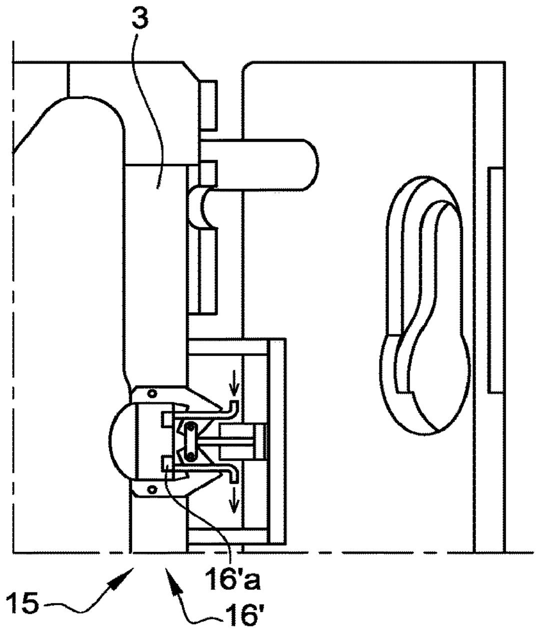
FIG. 16 is a cross-sectional view of a mold part according to the invention showing a combined gripping and hydraulic heating element in the non-activated state.

In the examples shown in FIGS. 13 to 16, the at least one first mold 1 section 3 comprises an element selected from a gripping element 15, a heating element 16, 16' and a combined gripping element 15 and heating element 16, 16' for gripping and/or heating a workpiece 31, which may or may not be said at least one internal component 30, intended to be molded with the first portion of the hollow body 10, the gripping element can thus be a clamp 15*a* or a suction element. In the examples of FIG. 13-14, the clamp 15*a* can go from an open position (FIG. 13) to a closed position (FIG. 14) using an actuator 15*b* in order to fold the parison 20 against the workpiece 31 such as, for example, explained in document EP 3,946,905. The heating element 16 in the example of FIG. 15 is an electric heater 16*a* whereas the one 16' in the example of FIG. 16 is a hydraulic heater 16' a in order to locally heat at least the parison 20. In one example, the workpiece 31 is a metal fastener or fibrous reinforcement.

Figure 12:
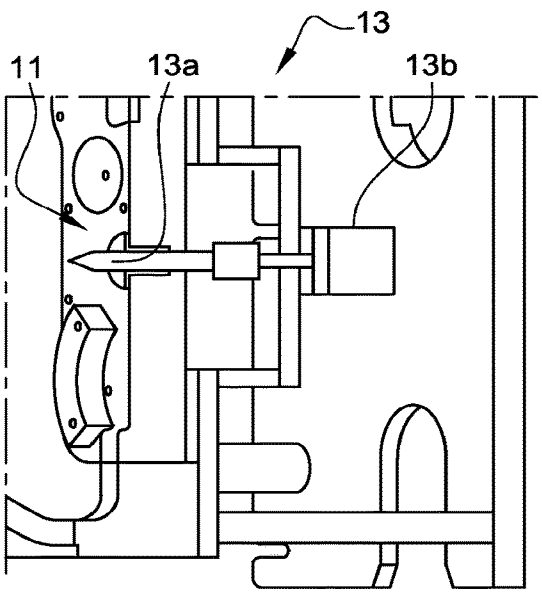
FIG. 12 is a cross-sectional view of a mold part according to the invention showing a blowing tool.

In the example shown in FIG. 12, the at least one first mold section 3 of mold 1 comprises a blowing tool 13 intended to introduce a pressurized gas inside the parison 20. As can be seen in FIG. 12, the blowing tool 13 comprises a blowing needle 13*a* capable of piercing the parison 20 in order to execute step d). It can also be seen that the needle 13*a* is mounted movable relative to the first molding surface 11 by means of an actuator 13*b* to go from a position retracted into the at least one first section 3 to a position protruding from the bottom of the first molding surface 11 and vice versa.

Figure 17:
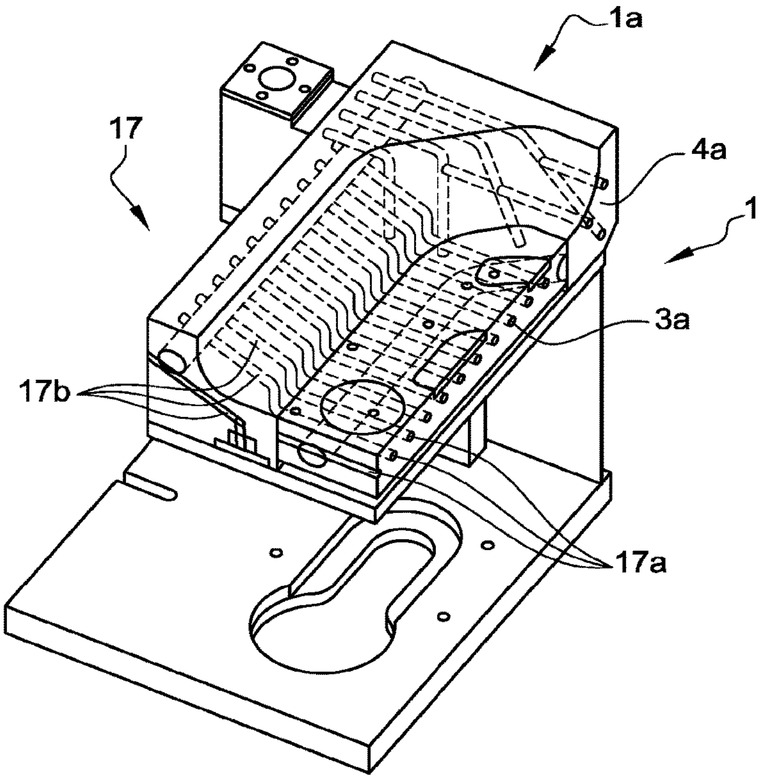
FIG. 17 is a cross-sectional view of a mold part according to the invention showing a cooling device.

In the example shown in FIG. 17, the at least one first section 3 and/or the second section 4 of the part 1*a* of the mold 1 comprises a cooling device 17 intended to cool a portion of the hollow body 10. The at least one first section 3*a* of mold 1 comprises cooling elements 17*a* intended to cool the first portion of the hollow body 10. The second mold 1 section 4*a* comprises cooling elements 17*b* intended to cool the second portion of the hollow body 10. Of course, the cooling elements 17*a*, 17*b* can be part of the same hydraulic circuit of the cooling device 17.

FIGS. 5 to 7 also show a method for molding by extrusion blow-molding a plastic hollow body 10 of a tank for a motor vehicle from a parison 20, the tank comprising at least one internal component 30 fixed inside the parison 20 during the molding of the hollow body 10, characterized in that the method comprises the following steps:

a) introducing said at least one internal component 30 and the molten parison 20 into an open mold 1 in two parts 1*a*, 1*b* so that said at least one internal component 30 is surrounded by the parison 20, at least one part 1*a*, 1*b* of said mold 1 comprising at least one first section 3 and a second section 4 internally delimiting a first molding surface 11 and a second molding surface 12, respectively, of a total molding surface of the mold 1, b) moving the at least one first section 3 of the part 1*a*, 1*b* of the mold 1 to bring the mold 1 into an intermediate closing position wherein the at least one first section 3 of the part of the mold 20 presses the parison against said at least one internal component 30 in order to fix said at least one internal component 30 inside the parison 20, the first molding surface 11 being configured to form at the same time, by pressing, a plurality of regions for fixing said at least one internal component 30 inside the parison 20, c) moving the second section 4 of the part 1*a*, 1*b* of the mold 1 relative to the at least one first section 3 of the part 1*a*, 1*b* of the mold 1 to bring the mold 1 into a final closing position wherein the two parts 1*a*, 1*b* of the mold 1 are closed against each other by internally delimiting the total molding surface for reproducing a predetermined shape of the hollow body 10 to be manufactured, d) performing a blowing of the parison 20 by placing said parison 20 on the total molding surface of the mold 1 using a pressurized gas, e) opening the mold 1 to take out the manufactured hollow body 10.

Preferably, a pressurized gas is introduced inside the parison 20 to pre-blow said parison 20 between step a) and step b). Such an introduction of gas can be carried out according to step b) of document WO 2008/138869 in order in particular to expand the parison by homogenizing the thickness of the parison. The introduction of gas at lower pressure than for step d) can be obtained in different ways known by the person skilled in the art. As a non-limiting example, the introduction of gas for the pre-blowing can be obtained by the blowing tool used to perform step d), by a dedicated tool mounted on the mold, by a hollow shaft for internal component support or by a nozzle comprised in the parison extrusion head.

Advantageously, in step b), said at least one internal component 30 can be fixed inside the parison 20 by welding, heading or mechanical anchoring.

In the final closed position of the mold 1, the blowing of step d) is carried out under a blowing pressure of the order of 10 bar (1 MPa). In order for the blowing pressure not to be exerted on the actuator 6 via the at least one first mold section 3, a force recovery is carried out on a support plate 9 rigidly connected to the molding machine 100.

Figure 8:
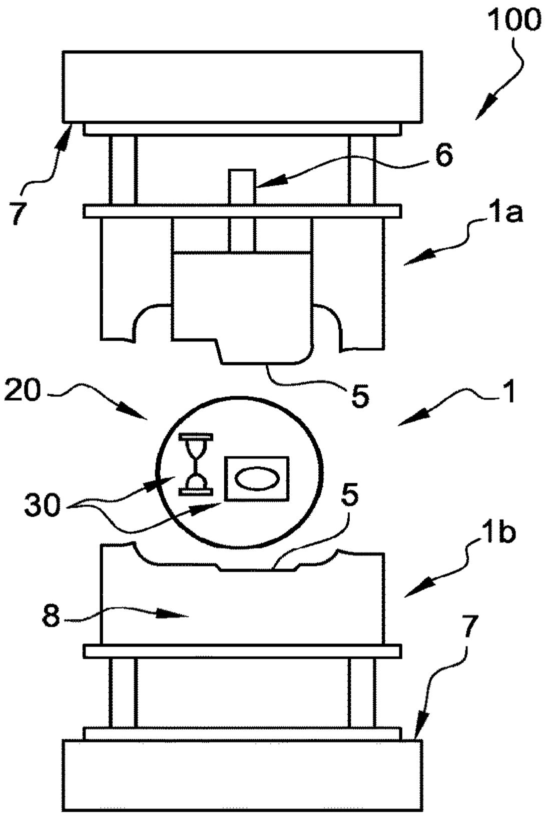
FIGS. 8 to 10 are schematic sectional views of a second embodiment of a mold according to the invention in different successive positions.

FIGS. 8 to 10 show a second embodiment of the mold 1. The second embodiment differs from the first embodiment in that the second mold part 1*b* of mold 1 forms a single-piece section 8. In other words, the single-piece section 8 in FIGS. 8 to 10 replaces the at least one first section 3*b* and the second section 4*b* of the part 1*b* of the mold 1 relative to the first embodiment of FIGS. 5 to 7. This simplifies the mold 1 by reducing the number of parts necessary for its construction.

The invention is not limited to the embodiments and variants presented, and other embodiments and variants will become clearly apparent to the person skilled in the art. Thus, the above embodiments are examples. Although the description refers to one or more embodiments, this does not necessarily mean that each reference relates to the same embodiment, or that the features apply only to a single embodiment. Simple features of different embodiments can also be combined and/or interchanged to provide other embodiments. In a non-limiting manner, in the second embodiment, only one actuator 7 is used to move the second section 4*a* toward the single-piece section 8 (which would therefore be static) in order to further simplify the molding machine 100. Likewise, although the figures show the presence of a single first section 3*a*, 3*b* of the part 1*a*, 1*b* of the mold 1, it can be envisaged that the at least one first section 3*a*, 3*b* of mold 1 comprises a plurality of first sections 3*a*, 3*b*, for example two, three, four, five, six, seven, eight, nine or ten first sections 3*a*, 3*b*.

LIST OF REFERENCES

1: mold
1*a*: first part of the mold
1*b*: second part of the mold
2: mold cavity
3, 3*a*, 3*b*: first mold section
4, 4*a*, 4*b*: second mold section
5: contact region
6: first actuator
7: second actuator
8: single-piece section
9: support plate
10: hollow body
11, 11*a*, 11*b*: first molding surface
12, 12*a*, 12*b*: second molding surface
13: blowing tool
13*a*: blowing needle
13*b*: blowing needle actuator
14: suction element
14*a*: bottom suction element
14*b*: contact region 5 suction element
14*c*: connection to a suction device
15: gripping element
15*a*: clamp
15*b*: actuator
16, 16': heating element
16*a*: electric heater
16*b*: hydraulic heater
17: cooling device
17*a*: cooling element of the first section 3*a*
17*b*: cooling element of the second section 4*a*
20: parison
30: internal component
31: workpiece
100: extrusion blow molding machine

The invention claimed is:

1. A method for molding by extrusion blow-molding a plastic hollow tank body for a motor vehicle from a parison, the tank comprising at least one internal component fixed inside the parison during the molding of the hollow tank body, the method comprising:

a) introducing at least one internal component and a molten parison into an open mold in two parts so that said at least one internal component is surrounded by the parison, at least one of the two parts of the mold comprising at least one first section and a second section internally delimiting a first molding surface and a second molding surface, respectively, of a total molding surface of the mold;

b) moving the at least one first section of the at least one of two parts of the mold to bring the mold into an intermediate closing, wherein the at least one first section of the at least one of two parts of the mold presses the parison against said at least one internal component in order to fix said at least one internal component inside the parison, the first molding surface being configured to form at the same time, by pressing, a plurality of regions for fixing said at least one internal component inside the parison;

c) moving the second section of the at least one of two parts of the mold relative to the at least one first section of the at least one of two parts of the mold to bring the mold into a final closing position, wherein the two parts of the mold are closed against each other by internally delimiting the total molding surface for reproducing a predetermined shape of the hollow tank body to be manufactured;

d) performing a blowing of the parison by placing said parison on the total molding surface of the mold by introducing a pressurized gas; and e) opening the mold to take out a manufactured hollow body, wherein a pressurized gas is introduced inside the parison to pre-blow said parison between the introducing and the moving.

2. The method according to claim 1, wherein, in the moving, said at least one internal component is fixed inside the parison by welding, heading or mechanical anchoring.

3. A mold for manufacturing by extrusion blow-molding a hollow tank body made of plastic material for a motor vehicle from a parison, the tank comprising at least one internal component fixed to an interior of the parison during the molding of the hollow tank body, the mold comprising:

two parts movable relative to one another delimiting internally, when they are closed against each other in a final closing position, a total molding surface intended to reproduce a predetermined shape of the hollow tank body to be manufactured, at least one of the two parts of the mold comprising:

at least one first section having a first molding surface of a first portion of the hollow tank body to be manufactured, said first molding surface comprising at least one contact region configured to form, by pressing obtained by moving the at least one first section towards an intermediate closing position of the two parts, a region for fixing said at least one internal component inside the parison, and a second section having a second surface for molding a second portion of the hollow tank body to be manufactured, wherein the second section of the at least one of the two parts of the mold is movable relative to the at least one first section of the at least one of the two parts of the mold at least between the intermediate closing position and the final closing position of the parts of the mold, and wherein the first molding surface of the at least one of the two parts of the mold comprises a plurality of contact regions and is configured so that the contact regions form at the same time, by pressing obtained by moving the at least one first section towards the intermediate closing position of the two parts, a plurality of regions for fixing said at least one internal component inside the parison, and wherein the at least one internal component is attached to the parison by pressure between the first section of the first part and the second part.

4. The mold according to claim 3, wherein the first molding surface for molding the at least one of two parts of the mold is configured to extend along a circumscribed surface containing the contact regions associated with the at least one of two parts of the mold.

5. The mold according to claim 4, wherein the circumscribed surface of the first molding surface of the at least one of two parts of the mold comprises a predetermined margin distance at least around the contact regions of said at least one internal component associated with the at least one of two parts of the mold in order to limit ripples of a material around each region for fixing.

6. The mold according to claim 5, wherein the predetermined margin distance at least around the regions for fixing is between 1 mm and 60 mm.

7. The mold according to claim 4, wherein the circumscribed surface of the first molding surface of the at least one of two parts of the mold is at least equal to 30% of the total molding surface.

8. The mold according to claim 3, wherein each of the two parts of the mold comprises at least one first section and a second section.

9. The mold according to claim 8, wherein the at least one first section of each of the two parts of the mold optionally includes at least one bearing region configured to press the parison against said same at least one internal component in order to form at least two different regions for fixing said same at least one internal component for fixing said same at least one internal component inside the parison during the molding of the hollow tank body.

10. The mold according to claim 3, wherein only one of the two parts of the mold comprises at least one first section and a second section.

11. The mold according to claim 3, wherein in the final closing position, the at least one first section of each of the two parts of the mold is surrounded by its second section of each of the two parts of the mold.

12. The mold according to claim 3, wherein the at least one first section of the at least one of the two parts of the mold comprises at least one suction element to suck the parison during the molding of the hollow tank body.

13. The mold according to claim 3, wherein the at least one first section of the at least one of the two parts of the mold comprises an element selected from the group consisting of a gripping element, a heating element, and a combined gripping and heating element for gripping and/or heating a workpiece to be molded with the first portion of the hollow tank body.

14. The mold according to claim 3, wherein the at least one first section of the at least one of the two parts of the mold comprises a blowing tool to introduce a pressurized gas inside the parison.

15. The mold according to claim 3, wherein the at least one first section of the at least one of the two parts of the mold comprises a plurality of first sections.

16. A machine for molding by extrusion blow-molding a hollow tank body made of plastic material for a motor vehicle from a parison, the machine comprises:

the mold according to claim 3.

17. The mold according to claim 3, wherein the first molding surface extends through the plurality of contact regions for fixing the at least one internal component inside the parison.

18. A mold for manufacturing by extrusion blow-molding a hollow tank body made of plastic material for a motor vehicle from a parison, the tank comprising at least one internal component fixed to an interior of the parison during the molding of the hollow tank body, the mold comprising:

two parts movable relative to one another delimiting internally, when they are closed against each other in a final closing position, a total molding surface intended to reproduce a predetermined shape of the hollow tank body to be manufactured, at least one of the two parts of the mold comprising:

at least one first section having a first molding surface of a first portion of the hollow tank body to be manufactured, said first molding surface comprising at least one contact region configured to form, by pressing obtained by moving the at least one first section towards an intermediate closing position of the two parts, a region for fixing said at least one internal component inside the parison, and a second section having a second surface for molding a second portion of the hollow tank body to be manufactured, wherein the second section of the at least one of the two parts of the mold is movable relative to the at least one first section of the at least one of the two parts of the mold at least between the intermediate closing position and the final closing position of the parts of the mold, and wherein the first molding surface of the at least one of the two parts of the mold comprises a plurality of contact regions and is configured so that the contact regions form at the same time, by pressing obtained by moving the at least one first section towards the intermediate closing position of the two parts, a plurality of regions for fixing said at least one internal component inside the parison, and wherein the at least one first section and/or the second section of the at least one of the two parts of the mold comprises a cooling device to cool a portion of the hollow tank body.

* * * * *